(12) United States Patent
Nozawa (10) Patent No.: US 12,259,335 B2
(45) Date of Patent: Mar. 25, 2025

(54) INSPECTION APPARATUS, INJECTION MOLDING SYSTEM, AND INSPECTION METHOD

(71) Applicant: SUMITOMO HEAVY INDUSTRIES, LTD., Tokyo (JP)

(72) Inventor: Itta Nozawa, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 90 days.

(21) Appl. No.: 17/820,564

(22) Filed: Aug. 18, 2022

(65) Prior Publication Data

US 2023/0070161 A1 Mar. 9, 2023

(30) Foreign Application Priority Data

Sep. 3, 2021 (JP) .................. 2021-144030

(51) Int. Cl.
| | |
|---|---|
| G06T 7/00 | (2017.01) |
| B29C 45/76 | (2006.01) |
| G01N 21/23 | (2006.01) |
| G01N 21/88 | (2006.01) |
| H04N 23/55 | (2023.01) |
| H04N 23/56 | (2023.01) |

(52) U.S. Cl.
CPC ......... *G01N 21/8806* (2013.01); *B29C 45/76* (2013.01); *G01N 21/23* (2013.01); *G06T 7/001* (2013.01); *H04N 23/55* (2023.01); *H04N 23/56* (2023.01); *B29C 2945/7629* (2013.01); *B29C 2945/76464* (2013.01); *G01N 2021/8848* (2013.01); *G01N 2201/0683* (2013.01)

(58) Field of Classification Search
CPC .............. G01N 21/8806; G01N 21/23; G01N 2021/8848; G01N 2201/0683; G01N 21/95; B29C 45/76; B29C 2945/7629; B29C 2945/76464; G06T 7/001; H04N 23/55; H04N 23/56

See application file for complete search history.

(56) References Cited

U.S. PATENT DOCUMENTS

| | | | |
|---|---|---|---|
| 4,920,385 A | * | 4/1990 | Clarke .................. G01N 21/88 356/237.2 |
| 9,625,369 B2 | * | 4/2017 | Shribak ................ G02B 27/286 |
| 9,943,984 B2 | * | 4/2018 | Seike ..................... B29C 45/77 |

(Continued)

FOREIGN PATENT DOCUMENTS

| | | |
|---|---|---|
| JP | 5908384 B2 | 4/2007 |
| JP | H1-120317 A | 9/2017 |
| WO | WO2021/205377 A1 | 10/2021 |

OTHER PUBLICATIONS

Office Action of the corresponding DE 10 2022 121 994.1 mailed on Feb. 8, 2024.

(Continued)

*Primary Examiner* — Jared Walker
(74) *Attorney, Agent, or Firm* — WTA Patents (57) ABSTRACT

The inspection apparatus includes: a linear polarizer and a wave plate generating polarized light from light emitted from a light source; a polarization camera imaging the polarized light generated by the linear polarizer and the wave plate and transmitted through a molding product; and a determination unit determining a state of the molding product using an image captured by the polarization camera.

10 Claims, 9 Drawing Sheets

(56) References Cited

U.S. PATENT DOCUMENTS

| | | | |
|---|---|---|---|
| 11,668,658 B2* | 6/2023 | Yacoubian | G01N 21/4788 |
| | | | 356/489 |
| 2015/0069247 A1* | 3/2015 | Asundi | G01N 21/23 |
| | | | 250/341.3 |
| 2017/0165873 A1* | 6/2017 | Regelman | G01J 3/463 |
| 2018/0311883 A1* | 11/2018 | Moffitt | B29C 49/12 |
| 2020/0134773 A1* | 4/2020 | Pinter | G01N 21/8806 |
| 2020/0209602 A1* | 7/2020 | Pau | G01M 11/331 |
| 2020/0234419 A1* | 7/2020 | Ota | G01N 21/90 |
| 2020/0286249 A1* | 9/2020 | Toya | G02B 27/14 |
| 2021/0299879 A1* | 9/2021 | Pinter | B25J 9/1697 |
| 2021/0356408 A1* | 11/2021 | Yacoubian | B22F 10/20 |
| 2021/0356572 A1* | 11/2021 | Kadambi | G06T 7/593 |
| 2023/0120081 A1* | 4/2023 | Laico | B29C 49/80 |
| | | | 356/240.1 |

OTHER PUBLICATIONS

Schadhauser, Maximilian, Spritzgießverfahren mit Endlosfasereinzug: Technologie, Modellbildung und Modellvalidierung. Technische Universität Dresden, 2021.

* cited by examiner

IMAGE OF MOLDING PRODUCT 3

IMAGE OF
MOLDING PRODUCT 3

FIG. 9

INSPECTION APPARATUS, INJECTION MOLDING SYSTEM, AND INSPECTION METHOD

CROSS-REFERENCE TO RELATED APPLICATIONS

This application claims priority to Japanese Patent Application No. 2021-144030, filed on Sep. 3, 2021, which is incorporated by reference herein in its entirety.

BACKGROUND

Technical Field

Certain embodiments of the present invention relate to an inspection apparatus, an injection molding system, and an inspection method.

Description of Related Art

For example, the related art describes an injection molding machine including a cylinder for heating a resin with which a mold unit is filled and a monitoring device monitoring the situation in the cylinder based on a ratio of a refractive index of a molding product formed of the resin to a reference refractive index set in accordance with the type of the resin.

In addition, the related art describes a molding condition setting value correction apparatus used in an injection molding machine controlling an injection molding process based on a setting value and having a light source irradiating an injection molding product via a polarizing plate, imaging unit imaging the injection molding product via a polarizing plate, and setting value correction unit correcting the setting value based on a polarization stripe pattern obtained by the imaging means.

SUMMARY

According to an embodiment of the present invention, there is provided an inspection apparatus including: generating unit generating polarized light from light emitted from a light source; a polarization camera imaging the polarized light generated by the generating unit and transmitted through a molding product; and a determination unit determining a state of the molding product using an image captured by the polarization camera.

DETAILED DESCRIPTION

Against the background of, for example, corporate competitiveness enhancement and voluntary efforts related to volatile organic compound (VOC) emission reduction, resin molding apparatuses are required to be equipped with an autonomous molding mechanism capable of autonomous molding parameter determination. For autonomous molding parameter determination for realizing an autonomous molding mechanism, it is desirable to determine with high accuracy whether or not a molding product is normally molded.

The present invention is to provide an inspection apparatus, or the like, with which it can be determined with high accuracy whether or not a molding product is normally molded.

Hereinafter, embodiments of the present invention will be described in detail with reference to the accompanying drawings.

One Embodiment

Figure 1:
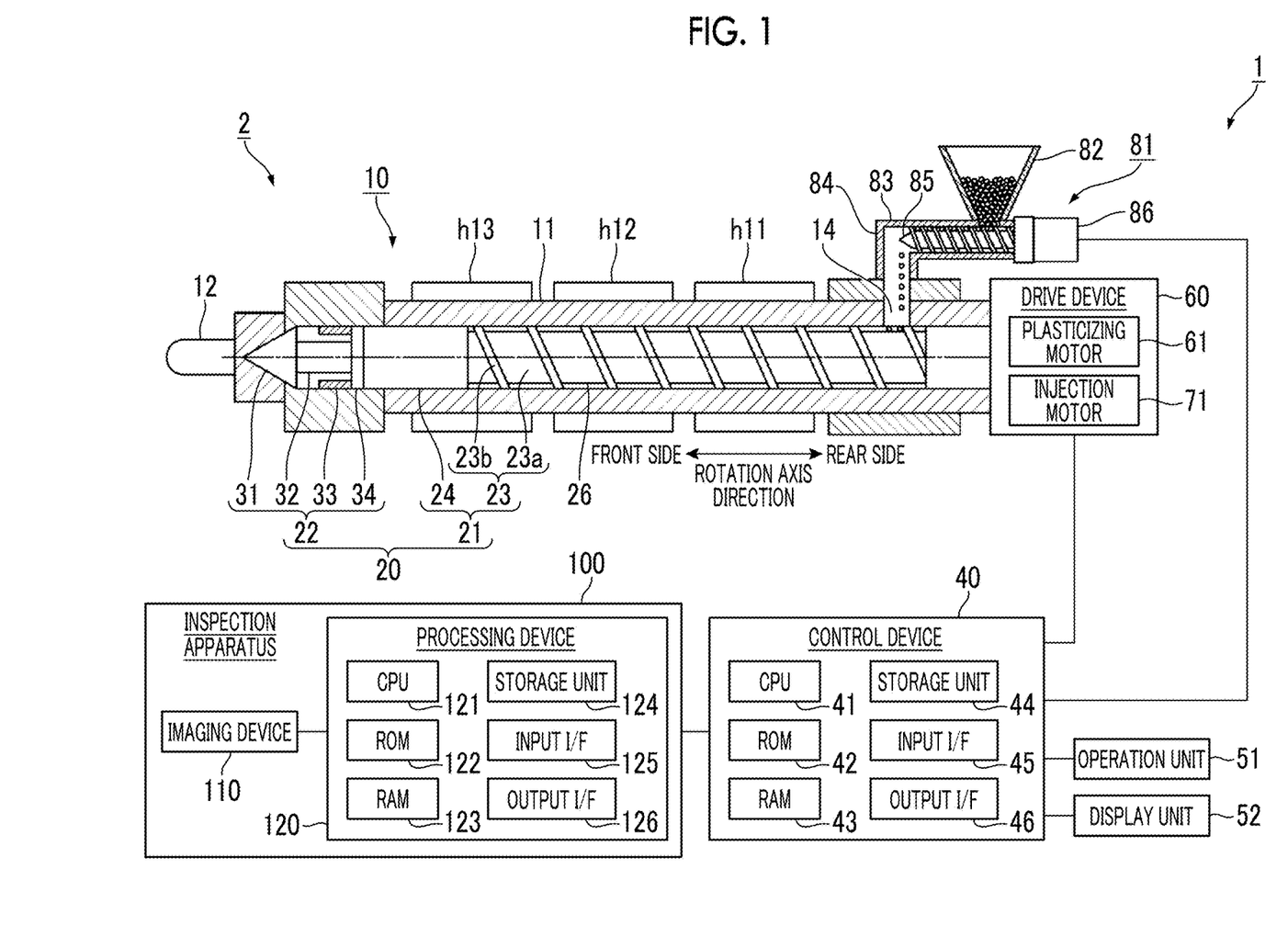
FIG. 1 is a diagram illustrating an example of a schematic configuration of an injection molding system according to one embodiment.

FIG. 1 is a diagram illustrating an example of a schematic configuration of an injection molding system 1 according to one embodiment.

Figure 2:
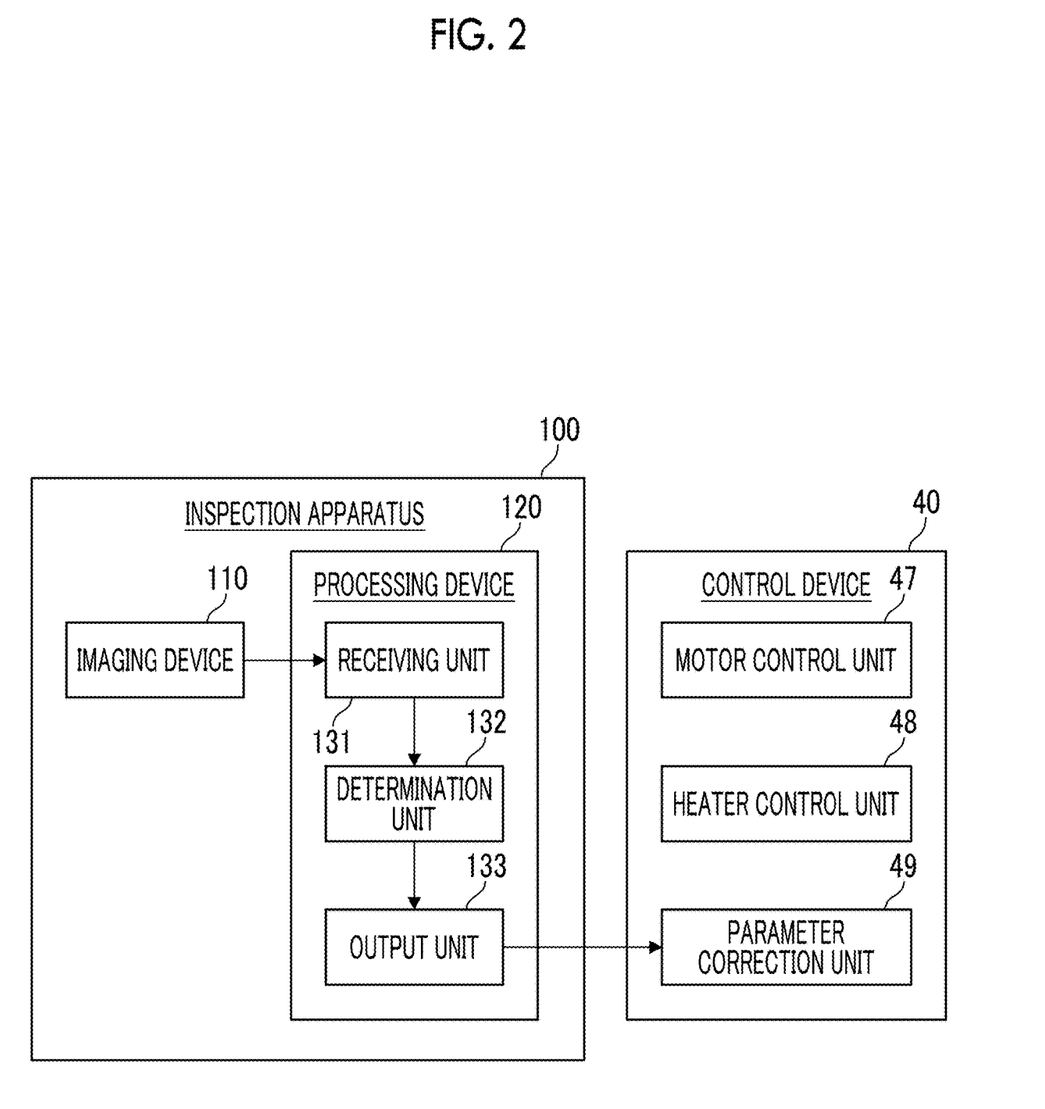
FIG. 2 is an example of a block diagram illustrating functions of a control device and of a processing device.

FIG. 2 is an example of a block diagram illustrating functions of a control device 40 and of a processing device 120.

The injection molding system 1 includes an injection molding machine 2 and an inspection apparatus 100 inspecting whether or not a molding product 3 (see FIG. 3) molded by the injection molding machine 2 is normally molded.
Injection Molding Machine 2

First, the injection molding machine 2 will be described. In the following description, a direction of resin injection is defined as a front side, and a direction opposite to the resin injection direction is defined as a rear side.

The injection molding machine 2 includes a mold clamping unit (not illustrated), an injection unit 10, a material supply device 81, the control device 40 controlling the entire apparatus, an operation unit 51 receiving an input operation from a user, and a display unit 52 displaying an operation reception screen or an image.

The mold clamping unit, the injection unit 10, the material supply device 81, and the control device 40 will be described in detail later.

The operation unit 51 can be exemplified by an input device such as a button, a switch, and a touch panel. The display unit 52 can be exemplified by a liquid crystal display or an organic EL display. The operation unit 51 and the display unit 52 may be configured integrally.

The injection molding machine 2 has a mold closing process, a mold clamping process, a filling process, a holding pressure process, a cooling process, a plasticizing process, a mold opening process, and an ejection process as one cycle and repeatedly manufactures the molding product 3. The mold closing process is a process of closing a mold unit configured by a stationary mold and a movable mold. The mold clamping process is a process of clamping the mold unit. The filling process is a process of pouring a molten resin into the mold unit. The holding pressure process is a process of applying pressure to the poured resin. The cooling process is a process of solidifying the resin in the mold unit after the holding pressure process. The plasticizing process is a process of plasticizing the molten resin for the next molding product 3. The mold opening process is a process of opening the mold unit. The ejection process is a process of ejecting the molding product 3 from the mold unit after the mold opening. It should be noted that the plasticizing process may be performed during the cooling process so that the molding cycle is shortened.

Mold Clamping Unit

The mold clamping unit, which includes a stationary platen to which a stationary mold is attached and a movable platen to which a movable mold is attached, performs mold closing, mold clamping, and mold opening by causing the movable platen to advance and retreat and causing the movable mold to come into contact with or be separated from the stationary mold. The mold clamping unit is not particularly limited in terms of type. Examples thereof include a toggle type using an electric motor and a toggle mechanism, a direct pressure type using a fluid pressure cylinder, and an electromagnetic type using a linear motor and an electromagnet.

Injection Unit 10

The injection unit 10 has a cylinder 11 for heating a resin as a molding material and a nozzle 12 arranged at a front end of the cylinder 11. In addition, the injection unit 10 has a screw 20 arranged in the cylinder 11 so as to be rotatable and capable of advancing and retreating in a rotation axis direction, heaters h11, h12, and h13 as heating sources heating the cylinder 11, and a drive unit 60 arranged on the rear side of the cylinder 11.

The screw 20, which has a screw main body 21 and an injection portion 22 arranged in front of the screw main body 21, is connected to the drive unit 60 via a rear end shaft portion. The screw main body 21 has a flight portion 23 and a pressure member 24 arranged so as to be detachable with respect to a front end of the flight portion 23. The flight portion 23 has a rod-shaped main body portion 23*a* and a helical flight 23*b* formed so as to protrude from an outer peripheral surface of the main body portion 23*a*, and a helical screw groove 26 is formed along the flight 23*b*. It can be exemplified that the depth of the screw groove 26 is constant and the screw compression ratio is constant from a rear end to the front end of the flight portion 23.

It should be noted that the screw 20 may not have the pressure member 24 and the flight portion 23 may be formed over the entire screw main body 21. In addition, from a rear end to a front end, the screw main body 21 may be divided into a supply unit where a resin is supplied, a compression zone where the supplied resin is melted while being compressed, and a metering zone where the molten resin is metered in fixed amounts. It is preferable that the depth of the screw groove 26 is the deepest in the supply unit, is the shallowest in the metering zone, and becomes shallow from the rear side toward the front side in the compression zone.

The injection portion 22 has a head portion 31 having a tip provided with a conical part, a rod portion 32 formed adjacent to the rear side of the head portion 31, a check ring 33 arranged around the rod portion 32, and a seal ring 34 attached to a front end of the pressure member 24.

During the plasticizing process, the check ring 33 is moved to the front side with respect to the rod portion 32 and is separated from the seal ring 34 as the screw 20 moves rearward, and then the resin is sent from the rear side of the injection portion 22 to the front side. In addition, during the injection process, the check ring 33 is moved to the rear side with respect to the rod portion 32 and is brought into contact with the seal ring 34 as the screw 20 moves forward, and then a resin backflow is prevented.

A resin feed port 14 as a molding material feed port is formed in a rear portion of the cylinder 11. The resin feed port 14 is formed at a point facing a rear end portion of the screw groove 26 with the screw 20 positioned on the foremost side in the cylinder 11. The material supply device 81 supplying a resin into the cylinder 11 is attached to the resin feed port 14.

The drive unit 60 rotates the screw 20 or causes the screw 20 to advance and retreat in the cylinder 11.

The drive unit 60 has a plasticizing motor 61 as a drive source rotating the screw 20 in the cylinder 11 and an injection motor 71 as a drive source moving the screw 20 in the rotation axis direction in the cylinder 11. It can be exemplified that the plasticizing motor 61 and the injection motor 71 are servomotors.

Provided between the injection motor 71 and the screw 20 is, for example, a motion conversion mechanism converting rotary motion of the injection motor 71 into linear motion of the screw 20. For example, the motion conversion mechanism has a screw shaft and a screw nut screwing onto the screw shaft. It can be exemplified that a ball, a roller, or the like is provided between the screw shaft and the screw nut. The drive source that moves the screw 20 in the rotation axis direction is not limited to the injection motor 71 and may be, for example, a hydraulic cylinder.

Material Supply Device 81

The material supply device 81 has a hopper 82 accommodating a molding material (such as resin pellets), a feed cylinder 83 extending in a horizontal direction from a lower end of the hopper 82, and a tubular guide portion 84 extending downward from a front end of the feed cylinder 83. In addition, the material supply device 81 has a feed screw 85 rotatably arranged in the feed cylinder 83 and a feed motor 86 rotating the feed screw 85.

The resin supplied from the inside of the hopper 82 into the feed cylinder 83 is moved forward along the screw groove of the feed screw 85 as the feed screw 85 rotates. The resin sent from a front end of the feed screw 85 into the guide portion 84 drops in the guide portion 84 and is supplied into the cylinder 11.

It should be noted that the feed cylinder 83 does not necessarily have to extend in the horizontal direction and may, for example, extend obliquely with respect to the horizontal direction. In addition, the feed cylinder 83 may be higher on an outlet side than on an inlet side. In addition, the resin supplied into the feed cylinder 83 may be heated by a heater (not illustrated). At this time, the resin is preferably heated to a non-melting temperature such as a predetermined temperature equal to or lower than the glass transition point.

Control Device 40

The control device 40 has a CPU 41, a ROM 42 storing a control program or the like, a readable and writable RAM 43 storing a calculation result or the like, a storage unit 44 such as a hard disk, an input interface (I/F) 45, and an output interface (I/F) 46. The control device 40 implements various functions by causing the CPU 41 to execute a program stored in the ROM 42, the storage unit 44, or the like.

The control device 40 has a motor control unit 47 controlling the drive of the plasticizing motor 61, the injection motor 71, the feed motor 86, and the like, a heater control unit 48 controlling the temperatures of the heaters h11 to h13, and a parameter correction unit 49 correcting a molding parameter in molding the molding product 3. The functions of the motor control unit 47 and the heater control unit 48 will be described in association with the operation of the injection molding machine 2 to be described below. The parameter correction unit 49 will be described in detail later.

Operation of Injection Molding Machine 2

The operation of the injection molding machine 2 controlled by the control device 40 will be described below. In the plasticizing process, the motor control unit 47 of the control device 40 drives the plasticizing motor 61 to rotate the screw 20. At this time, the motor control unit 47 drives the feed motor 86 to rotate the feed screw 85. It can be exemplified that the motor control unit 47 synchronously rotates the screw 20 and the feed screw 85 during molding. The motor control unit 47 controls the current supplied to the plasticizing motor 61 such that the rotational speed of the screw 20 reaches, for example, a rotational speed set via the operation unit 51. In addition, the motor control unit 47 controls the current supplied to the feed motor 86 such that the rotational speed of the feed screw 85 reaches, for example, a rotational speed set via the operation unit 51.

The resin supplied into the cylinder 11 by the material supply device 81 is immediately sent to the front side by the screw 20 without staying at the resin feed port 14. The screw groove 26 of the screw 20 is not densely filled with the resin, and the resin in the screw groove 26 is in a sparse state. Accordingly, the amount of the resin that is sent to the front side by the screw 20 per unit time increases as the speed of the resin supply by the material supply device 81 increases.

The resin supplied into the cylinder 11 is moved forward along the screw groove 26 of the screw 20 as the screw 20 rotates and is heated and melted by the heaters h11 to h13. The heater control unit 48 of the control device 40 controls the electric power supplied to the heaters h11 to h13 such that the temperatures of the heaters h11 to h13 reach, for example, temperatures set via the operation unit 51.

In addition, the resin supplied into the cylinder 11 is gradually pressurized from the pressure rise start position of the resin in the screw main body 21 to the front end of the screw main body 21. The pressure rise start position is at a predetermined distance to the rear side from the pressure member 24 and is displaced in accordance with, for example, the ratio (synchronization rate) between the rotational speed of the screw 20 and the rotational speed of the feed screw 85. On the condition that the pressure rise start position is at a distance within a predetermined range from the pressure member 24, the molten state of the resin is stabilized, and the weight of the molding product is stabilized.

The resin moved forward along the screw groove 26 of the screw 20 passes through the resin flow path between the pressure member 24 and the cylinder 11, is mixed therebetween, and then passes through the resin flow path between the cylinder 11 and the rod portion 32 and is moved forward. Then, the resin is sent to the front side of the screw 20 and is accumulated in the cylinder front portion. The screw 20 moves rearward as the molten resin is accumulated on the front side of the screw 20.

In the plasticizing process, the motor control unit 47 of the control device 40 controls the current supplied to the injection motor 71 such that the back pressure of the screw 20 reaches, for example, a back pressure set via the operation unit 51. By back pressure application to the screw 20, a rapid rearward movement of the screw 20 is suppressed, the kneadability of the resin is improved, and gas in the resin is capable of easily escaping to the rear side.

The motor control unit 47 monitors the position of the screw 20 with a position sensor (not illustrated) while the screw 20 is moved rearward. The control device 40 stops the drive of the plasticizing motor 61 when the screw 20 is moved rearward up to the plasticizing completion position and a predetermined amount of resin is accumulated on the front side of the screw 20. As a result, the rotation of the screw 20 is stopped, and the plasticizing process is completed. It can be exemplified that the motor control unit 47 stops the drive of the feed motor 86 and stops the rotation of the feed screw 85 simultaneously with the plasticizing process completion.

In the filling process, the motor control unit 47 of the control device 40 drives the injection motor 71 to move the screw 20 forward and to push the resin into a cavity space in the mold unit that is clamped. At that time, the motor control unit 47 controls the current supplied to the injection motor 71 such that the movement speed of the screw 20 in the rotation axis direction reaches, for example, a movement speed set via the operation unit 51.

In the holding pressure process, the motor control unit 47 controls the current supplied to the injection motor 71 such that the pressure of the resin reaches, for example, a pressure set via the operation unit 51. As a result, the resin with which the cavity space is filled shrinks by cooling, and yet resin replenishment is performed by the shrinkage amount.

It should be noted that the setting values that the motor control unit 47 uses in controlling the various motors (e.g., rotational speed, movement speed, pressure) and the temperature setting value that the heater control unit 48 uses in controlling the heaters h11 to h13 are stored as molding parameters in, for example, the ROM 42 or the storage unit 44.

Inspection Apparatus 100

As illustrated in FIG. 1, the inspection apparatus 100 has an imaging device 110 imaging the molding product 3 and the processing device 120 processing the image output from the imaging device 110.

Imaging Device 110

Figure 3:
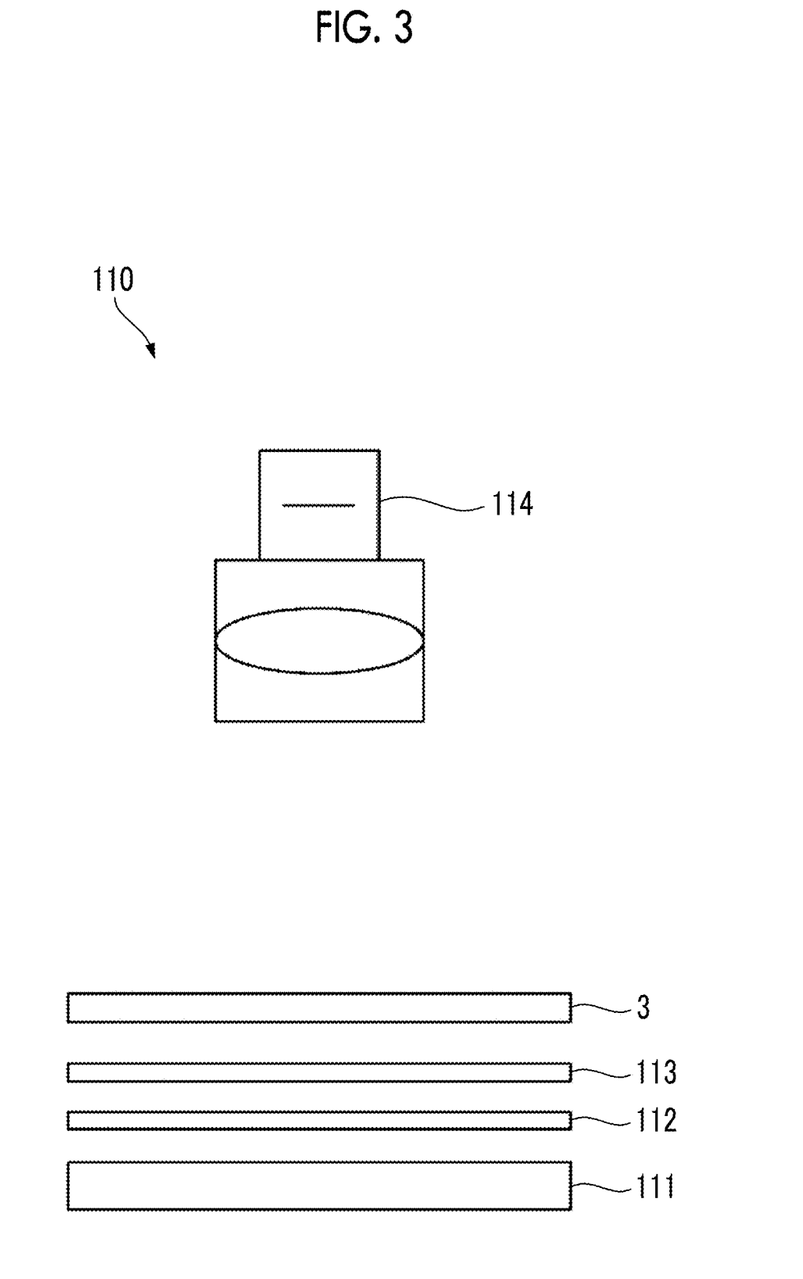
FIG. 3 is a diagram illustrating an example of a schematic configuration of an imaging device.

FIG. 3 is a diagram illustrating an example of a schematic configuration of the imaging device 110.

The imaging device 110 has a light source 111 generating light, a linear polarizer 112 producing linearly polarized light from the light emitted from the light source 111, a wave plate 113 converting the linearly polarized light produced by the linear polarizer 112 into circularly polarized light, and a polarization camera 114.

The light source 111 can be exemplified by lighting such as a lamp, an incandescent lamp, a fluorescent lamp, and an LED. The light emitted from the light source 111 is not limited to visible light and may be infrared light. Light with a wavelength of 360 to 900 nm is desirable. The linear polarizer 112 is an optical element producing linearly polarized light from the light emitted from the light source 111.

The wave plate 113 can be exemplified as a $\lambda/4$ plate producing a phase difference of 90 degrees.

As for the polarization camera 114, polarizers of 0, 45, 90, and 135 degrees are regularly disposed between an imaging element and a lens, images corresponding to the four polarization angles can be acquired by single imaging, and a camera capable of generating an image obtained by calculating the direction and degree of polarization using the images can be exemplified (e.g., the four basic arithmetic operations, trigonometric function operations, and inverse trigonometric function operations).

In the imaging device 110 configured as described above, the molding product 3 molded by the injection molding machine 2 is disposed above the wave plate 113, and the light transmitted through the molding product 3 is imaged by the polarization camera 114. Then, the polarization camera 114 outputs, to the processing device 120, an image obtained by calculating the direction and degree of polarization using the images corresponding to the four polarization angles.

Figure 4:
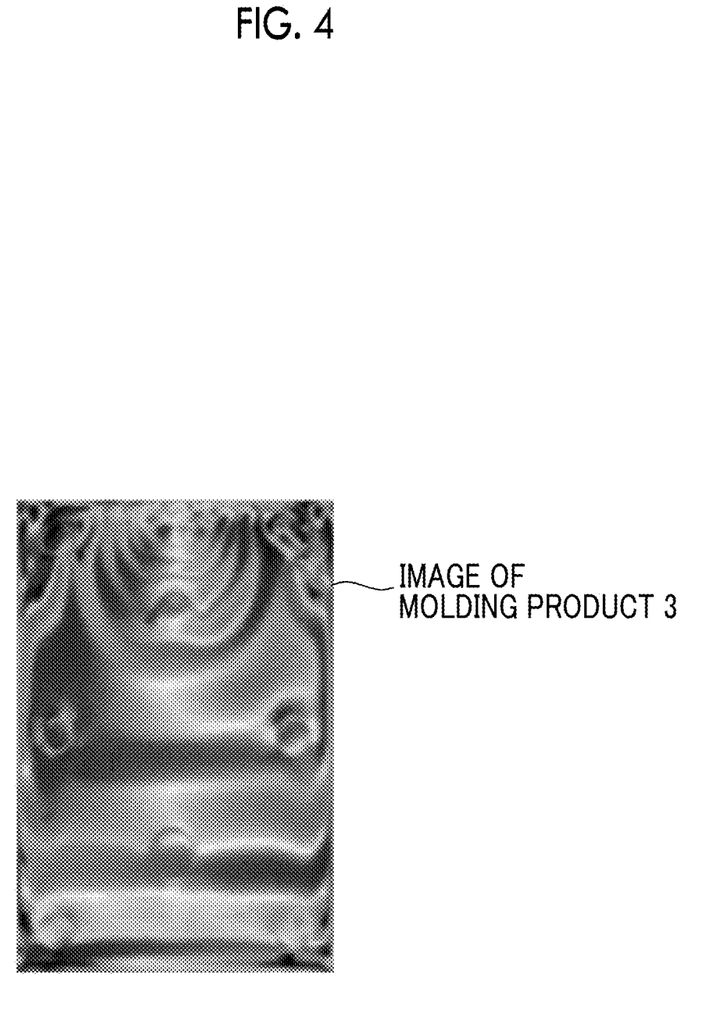
FIG. 4 is a diagram illustrating an example of an image output from the imaging device.

FIG. 4 is a diagram illustrating an example of the image output from the imaging device 110. FIG. 4 illustrates an example of the image output from the imaging device 110 to the processing device 120 in a case where the molding product 3 that has a thin rectangular parallelepiped shape is imaged by the imaging device 110.

In the imaging device 110 configured as described above, circularly polarized light is made incident into the molding product 3 and, as a result, the birefringence of the molding product 3 changes the direction and degree of polarization. Then, the imaging device 110 images the circularly polarized light transmitted through the molding product 3 with the polarization camera 114, and output as a result is a striped image corresponding to the stress distribution attributable to a flow field or a crystal direction of the resin as illustrated in FIG. 4. Accordingly, with the imaging device 110, it is possible to visualize the stress distribution attributable to the flow field of the molding product 3 or the crystal direction of the resin.

It should be noted that in the imaging device 110, linearly polarized light transmitted through the linear polarizer 112 may be made incident into the molding product 3 without using the wave plate 113. However, in the case of a configuration in which linearly polarized light is made incident into the molding product 3, the light cannot be transmitted through the molding product 3 in a case where a main axis direction of the molding product 3 is orthogonal to a polarization direction, and thus information is lost and it may be impossible to output a striped image corresponding to the stress distribution to be measured. Accordingly, it is desirable to make circularly polarized light incident into the molding product 3 using the wave plate 113. By making circularly polarized light incident into the molding product 3, no information loss phenomenon occurs, and thus it is possible to output a general-purpose striped image that does not depend on the molding product 3. In addition, the wave plate 113 may be a λ/2 plate. The polarization direction can be vertically rotated when a λ/2 plate with an optical axis tilted to an azimuth angle of 45 degrees is used as the wave plate 113. As a result, the linearly polarized light transmitted through the linear polarizer 112 can be made incident into the molding product 3 with the polarization direction changed, and an information loss phenomenon can be suppressed. In other words, in a state where the main axis direction of the molding product 3 is orthogonal to the polarization direction and no light can be transmitted through the molding product 3, it is impossible to output a striped image corresponding to the stress distribution to be measured, and thus it is possible to suppress information loss attributable to light being incapable of transmission through the molding product 3 by vertically inverting the direction of polarization using a λ/2 plate. In addition, the wave plate 113 may be, for example, a λ/8 plate converting linearly polarized light into elliptically polarized light.

In addition, it is desirable that the molding product 3 as an imaging target of the imaging device 110 satisfies the following conditions (1) to (3).

(1) The molding product 3 is transparent or translucent with respect to the wavelength of the light generated by the light source 111.

(2) The birefringence derived from the crystallinity of the molding product 3 is sufficiently small with respect to the birefringence attributable to the residual stress of the molding product 3. That is, the molding product 3 is not distorted. This is because it is difficult to distinguish whether the birefringence is residual stress-derived or crystallinity-derived when a substance large in birefringence even in an unstressed state is used.

(3) No external force other than residual stress is applied to the molding product 3.

In addition, how to dispose the molding product 3 above the wave plate 113 is not particularly limited insofar as the molding product 3 is disposed above the wave plate 113. For example, it can be exemplified that the molding product 3 ejected from the mold unit as a result of the ejection process is grasped by a robot arm and is disposed above the wave plate 113 of the imaging device 110. In addition, the disposition may be performed by a person.

Processing Device 120

As illustrated in FIG. 1, the processing device 120 includes a CPU 121, a ROM 122 storing a control program or the like, a readable and writable RAM 123 storing a calculation result or the like, a storage unit 124 such as a hard disk, an input interface (I/F) 125, and an output interface (I/F) 126. The processing device 120 implements various functions by causing the CPU 121 to execute a program stored in the ROM 122, the storage unit 124, or the like.

The storage unit 124 stores a reference image, which is obtained by the imaging device 110 imaging a molding product determined to be normal by human eyes. For example, the image illustrated in FIG. 4 is an example of the reference image.

As illustrated in FIG. 2, the processing device 120 has a receiving unit 131 receiving the image of the molding product 3 output from the imaging device 110, a determination unit 132 determining the quality of the molding product 3 using the image of the molding product 3 received by the receiving unit 131, and an output unit 133 outputting the determination result of the determination unit 132 to the control device 40.

The determination unit 132 calculates the degree of similarity between the reference image stored in the storage unit 124 and the image of the molding product captured by the imaging device 110 and determines the quality of the molding product via comparison between the degree of similarity and a predetermined threshold. It can be exemplified that the determination unit 132 calculates the degree of similarity using known mean squared error (MSE), SNR, PSNR, SSIM, or the like. Then, in a case where the degree of similarity is lower than the threshold, the determination unit 132 determines that the molding product 3 is defective. On the other hand, in a case where the degree of similarity is equal to or higher than the threshold, the determination unit 132 determines that the molding product is not defective. It should be noted that it can be exemplified that the threshold is set in accordance with, for example, the type of the molding product 3 or the type of the resin.

The output unit 133 outputs, to the control device 40, the result determined by the determination unit 132 as to whether the molding product 3 is defective or not.

Figure 5:
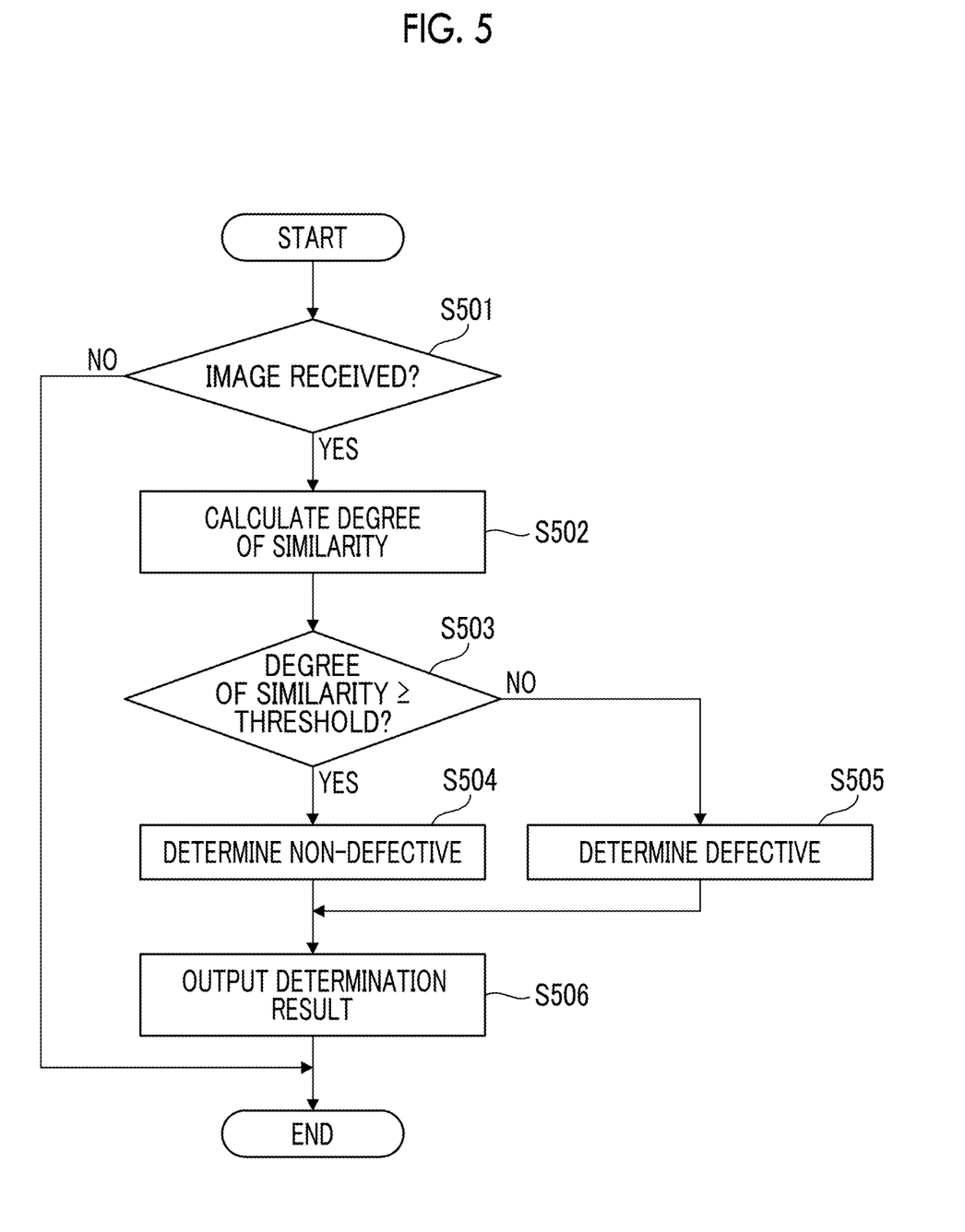
FIG. 5 is a flowchart illustrating an example of a procedure of inspection processing performed by the processing device.

FIG. 5 is a flowchart illustrating an example of the procedure of the inspection processing that is performed by the processing device 120.

The processing device 120 repeatedly executes this processing at, for example, a predetermined control cycle (e.g., every second).

The processing device 120 determines whether or not the receiving unit 131 has received the image of the molding product 3 from the imaging device 110 (S501). In a case where the image has been received (YES in S501), the processing device 120 calculates the degree of similarity between the image of the molding product 3 received in S501 and the reference image stored in the storage unit 124 (S502). Then, the processing device 120 determines whether or not the degree of similarity calculated in S502 is equal to or higher than a predetermined threshold (S503). Then, in a case where the degree of similarity is equal to or higher than the threshold (YES in S503), the processing device 120 determines that the molding product 3 is not defective (S504). On the other hand, in a case where the degree of similarity is lower than the threshold (NO in S503), the processing device 120 determines that the molding product 3 is defective (S505). Then, the processing device 120 outputs the determination result as to whether the molding product 3 is defective or not to the control device 40 (S506). The processing of S502, S503, S504, and S505 is performed by the determination unit 132, and the processing of S506 is performed by the output unit 133.

The processing device 120 ends the inspection processing in the case of no image being received (NO in S501).

As described above, the inspection apparatus 100 includes the linear polarizer 112 and the wave plate 113 as an example of generating unit generating polarized light from the light emitted from the light source 111, the polarization camera 114 imaging the polarized light generated by the linear polarizer 112 and the wave plate 113 and transmitted through the molding product 3 molded by the injection molding machine 2, and the determination unit 132 determining the state of the molding product 3 using the image captured by the polarization camera 114. In addition, by the method of inspection using the inspection apparatus 100, polarized light is generated from the light emitted from the light source 111, the polarization camera 114 images the generated polarized light transmitted through the molding product 3, and the state of the molding product 3 is determined using the image captured by the polarization camera 114.

According to the inspection apparatus 100 and the inspection method configured as described above, the polarization camera 114 is capable of outputting an image corresponding to the stress distribution attributable to the flow field or the crystal direction of the resin, the determination unit 132 determines the state of the molding product 3 using this image, and thus it can be determined with high accuracy whether or not the molding product 3 is normally molded. In addition, according to the image illustrated in FIG. 4, which is output by the polarization camera 114, many quantitative indicators such as defect information and stress information can be obtained. In addition, the image illustrated in FIG. 4 is output by imaging with the polarization camera 114, and thus many quantitative indicators can be acquired conveniently.

It should be noted that the timing of inspecting whether or not the molding product 3 molded by the injection molding machine 2 is normally molded is not particularly limited. For example, it can be exemplified that the molding product 3 ejected from the mold unit is inspected every cycle. Alternatively, the inspection may be performed every predetermined cycle. The predetermined cycle can be exemplified by 10, 50, or 100 cycles. Alternatively, the inspection may be performed every predetermined period. The predetermined period can be exemplified by one day or one week. For example, inspecting at a predetermined time every day (e.g., 17:00) or at a predetermined time every Friday (e.g., 17:00) can be exemplified.

In addition, as for the inspection target, in a case where a plurality of the molding products 3 are ejected from the mold unit, any one or more of the molding products 3 extracted therefrom may be inspected, or every molding product 3 may be inspected.

It should be noted that the polarization camera 114 in the above embodiment outputs an image obtained by calculating the direction and degree of polarization using images corresponding to four polarization angles, and the processing device 120 determines the quality of the molding product 3 using the image output from the polarization camera 114, and yet the present invention is not particularly limited to such an aspect. For example, the polarization camera 114 may output images corresponding to four polarization angles to the processing device 120, the processing device 120 may generate an image obtained by calculating the direction and degree of polarization using the images corresponding to the four polarization angles, and the quality of the molding product 3 may be determined using the generated image.

Parameter Correction Unit 49 of Control Device 40

The parameter correction unit 49 corrects a molding parameter in molding the molding product 3 next time and later using the determination result that the molding product 3 is defective output from the processing device 120 and the molding parameter in molding the molding product 3 in the injection molding machine 2.

In a case where the processing device 120 outputs the determination result that the molding product 3 is defective, the parameter correction unit 49 determines that the molding parameter in molding the molding product 3 in the injection molding machine 2 is not satisfactory. It can be exemplified that the molding parameter is the movement speed of the screw 20 in the filling process or the temperatures of the heaters h11 to h13. For example, it is conceivable that a change in stress distribution is caused by the mold unit for the molding product 3 wearing down and the fluidity of the molten resin in the mold unit deteriorating. Accordingly, it can be exemplified that the parameter correction unit 49 changes at least one of the movement speed of the screw 20 and the temperatures of the heaters h11 to h13. This is because the fluidity of the molten resin in the mold unit improves as the movement speed of the screw 20 increases and the fluidity of the molten resin in the mold unit improves as the temperatures of the heaters h11 to h13 rise and the temperature of the molten resin rises.

Figure 6:
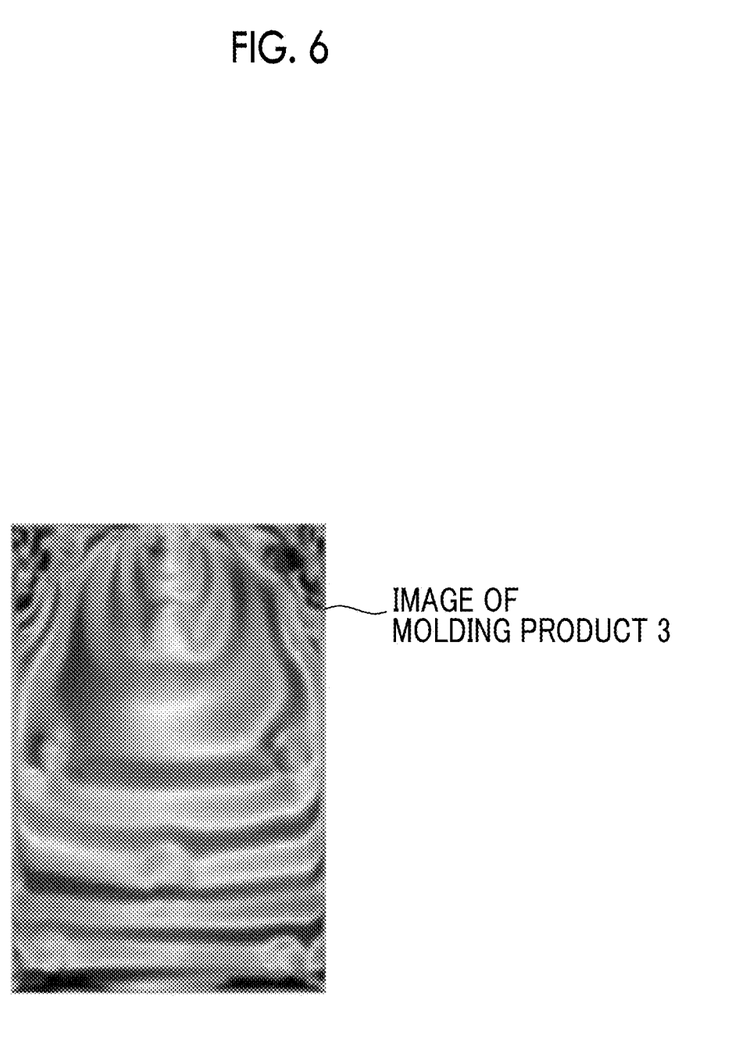
FIG. 6 is a diagram illustrating an example of an image of a molding product determined to be defective by a determination unit of the processing device.

FIG. 6 is a diagram illustrating an example of an image of the molding product 3 determined to be defective by the determination unit 132 of the processing device 120.

A case is conceivable where, for example, the receiving unit 131 of the processing device 120 has received the image of the molding product 3 illustrated in FIG. 6 from the imaging device 110. The determination unit 132 of the processing device 120 calculates the degree of similarity between the image of the molding product 3 illustrated in FIG. 6 and the reference image stored in the storage unit 124. Then, the determination unit 132 compares the degree of similarity with a predetermined threshold and determines that the molding product 3 is defective in a case where the degree of similarity is lower than the threshold. Then, the output unit 133 of the processing device 120 outputs, to the control device 40, the result that the molding product 3 is defective determined by the determination unit 132.

In the control device 40, the parameter correction unit 49 corrects a molding parameter in a case where the processing device 120 outputs the determination result that the molding product 3 is defective. For example, the parameter correction unit 49 performs correction such that the movement speed exceeds the setting value of the movement speed of the screw 20 in molding the defective molding product 3 stored in the ROM 42, the storage unit 44, or the like if the molding product 3 is defective due to the fluidity deterioration of the molten resin in the mold unit for the molding product 3. The parameter correction unit 49 stores the post-correction movement speed of the screw 20 in the ROM 42, the storage unit 44, or the like.

It should be noted that the parameter correction unit 49 preferably determines whether to change the movement speed of the screw 20 or the temperatures of the heaters h11 to h13 or whether to change both the movement speed of the screw 20 and the temperatures of the heaters h11 to h13 based on the type of the molding product 3, the type of the resin, or another molding parameter. In addition, the parameter correction unit 49 preferably determines how much to change a molding parameter based on the difference between the calculated degree of similarity and a threshold and increases the molding parameter as the difference increases.

As described above, the injection molding system 1 includes the inspection apparatus 100 and the parameter correction unit 49 using the determination result that the molding product 3 is defective output from the inspection apparatus 100 and a molding parameter in molding the molding product 3 in the injection molding machine 2 to correct the molding parameter. According to the injection molding system 1 configured in this manner, molding parameter determination can be performed autonomously.

It should be noted that although the inspection apparatus 100 has the imaging device 110 and the processing device 120 in the embodiment described above, the present invention is not limited to such an aspect.

For example, the control device 40 of the injection molding machine 2 may have the function of the processing device 120. For example, the control device 40 may have the receiving unit 131 receiving the image of the molding product 3 output from the imaging device 110 and the determination unit 132 determining the quality of the molding product 3 using the image of the molding product 3, and the parameter correction unit 49 may correct the molding parameter based on the determination result of the determination unit 132. In addition, in the case of such a configuration, it is preferable that the image of the molding product 3 as illustrated in FIGS. 4 and 6, which is output from the imaging device 110, can be displayed on the display unit 52. As a result, a user can view the image displayed on the display unit 52 and perform molding parameter correction via the operation unit 51.

Modification Examples of Quality Determination

The processing device 120 may determine the quality of the molding product 3 in the following aspects (1) to (3).

(1) The stress distribution of the non-defective molding product 3 obtained by simulation such as CAE is stored in the storage unit 124 as a reference stress distribution. Then, the determination unit 132 calculates the degree of similarity between the reference stress distribution stored in the storage unit 124 and the stress distribution obtained from the striped image of the molding product 3 captured by the imaging device 110 and determines the quality of the molding product 3 via comparison between the degree of similarity and a predetermined threshold.

(2) A striped image converted from the stress distribution of the non-defective molding product 3 obtained by simulation such as CAE is stored in the storage unit 124 as a reference image. Then, the determination unit 132 calculates the degree of similarity between the reference image stored in the storage unit 124 and the striped image of the molding product 3 captured by the imaging device 110 using known MSE, SNR, PSNR, SSIM, or the like and determines the quality of the molding product 3 via comparison between the degree of similarity and a predetermined threshold.

(3) Output unit outputting a pseudo image similar to a normal product is trained using the striped image of the molding product 3 determined as a normal product as training data, and the output unit is stored in the storage unit 124. Then, the degree of similarity is calculated between the pseudo image generated by inputting the striped image of the molding product 3 captured by the imaging device 110 to the output unit and the striped image of the molding product 3 captured by the imaging device 110, which is an actual image, and the quality of the molding product 3 is determined via comparison between the degree of similarity and a predetermined threshold.

The quality of the molding product 3 can also be determined with high accuracy in the above aspects (1) to (3).

Another Embodiment

Figure 7:
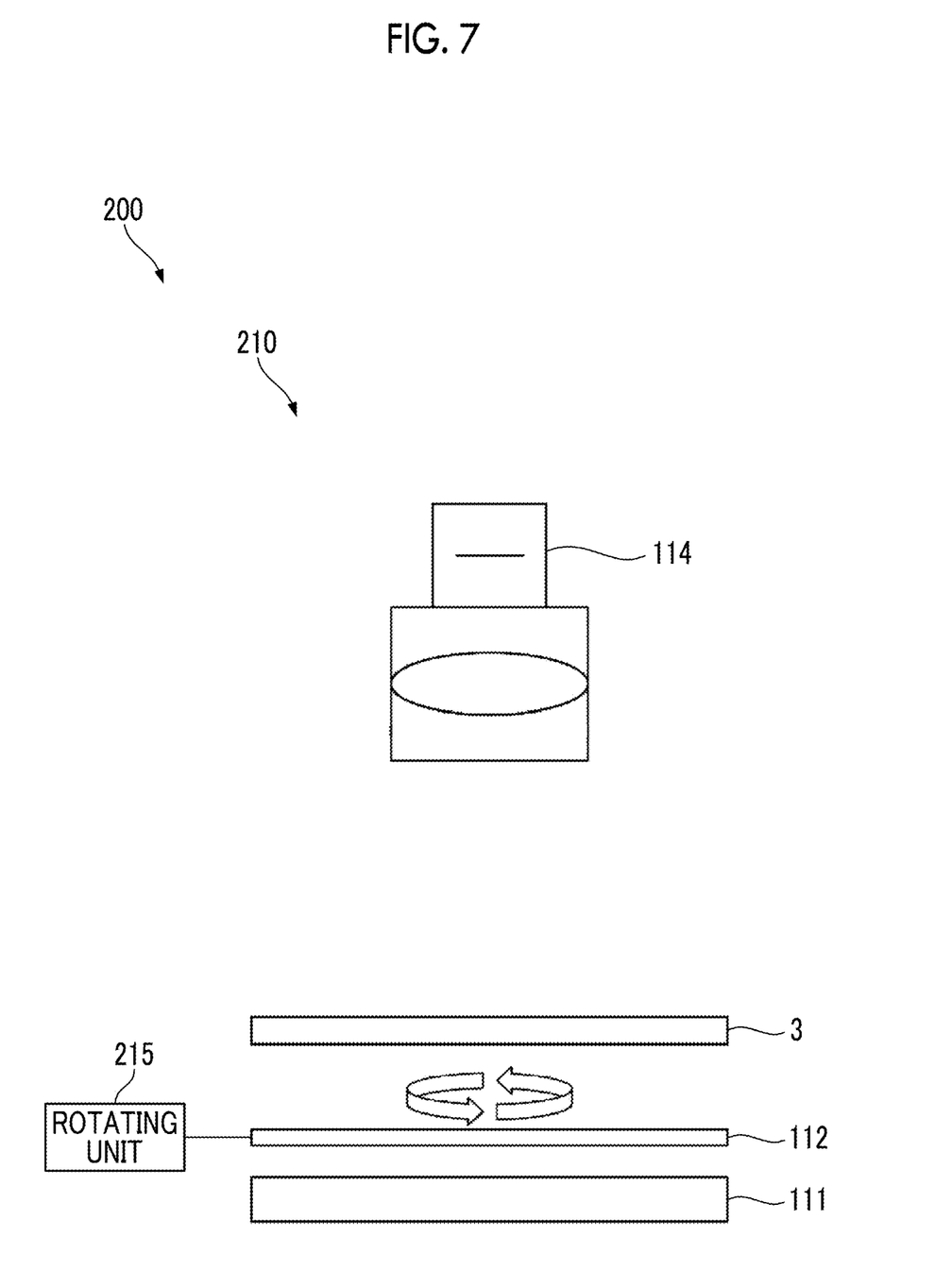
FIG. 7 is a diagram illustrating an example of a schematic configuration of an inspection apparatus according to another embodiment.

FIG. 7 is a diagram illustrating an example of a schematic configuration of an inspection apparatus 200 according to another embodiment. The inspection apparatus 200 according to another embodiment differs from the inspection apparatus 100 according to one embodiment in terms of the imaging device 110. The difference from one embodiment will be described below. Those components common to the one and another embodiments are denoted by the same reference numerals without detailed description.

An imaging device 210 according to another embodiment has the light source 111, the linear polarizer 112, the polarization camera 114, and rotating unit 215 for rotating the linear polarizer 112. The rotating unit 215 rotates the film-shaped linear polarizer 112 by 45, 90, and 135 degrees around a line orthogonal to a plate surface as a rotation center.

In the imaging device 210 configured as described above, the molding product 3 molded by the injection molding machine 2 is disposed above the linear polarizer 112, and the light transmitted through the molding product 3 is imaged by the polarization camera 114. Further, the rotating unit 215 rotates the linear polarizer 112 by 45, 90, and 135 degrees, and the polarization camera 114 images the light transmitted through the molding product 3 at each rotation angle. The polarization camera 114 outputs, to the processing device 120, images corresponding to the above four polarization angles at the rotation angles of 0, 45, 90, and 135 degrees and an image obtained by calculating the direction and degree of polarization using the images. It should be noted that the rotating unit 215 for rotating the linear polarizer 112 is not particularly limited in terms of configuration and rotation method. The linear polarizer 112 may be rotated by a robot or manually.

The imaging device 210 configured in this manner is also capable of outputting a striped image corresponding to the stress distribution attributable to the flow field or the crystal direction of the resin as illustrated in FIG. 4. Then, by the determination unit 132 determining the state of the molding product 3 using this image, it can be determined with high accuracy whether or not the molding product 3 is normally molded.

Further Embodiment

Figure 8:
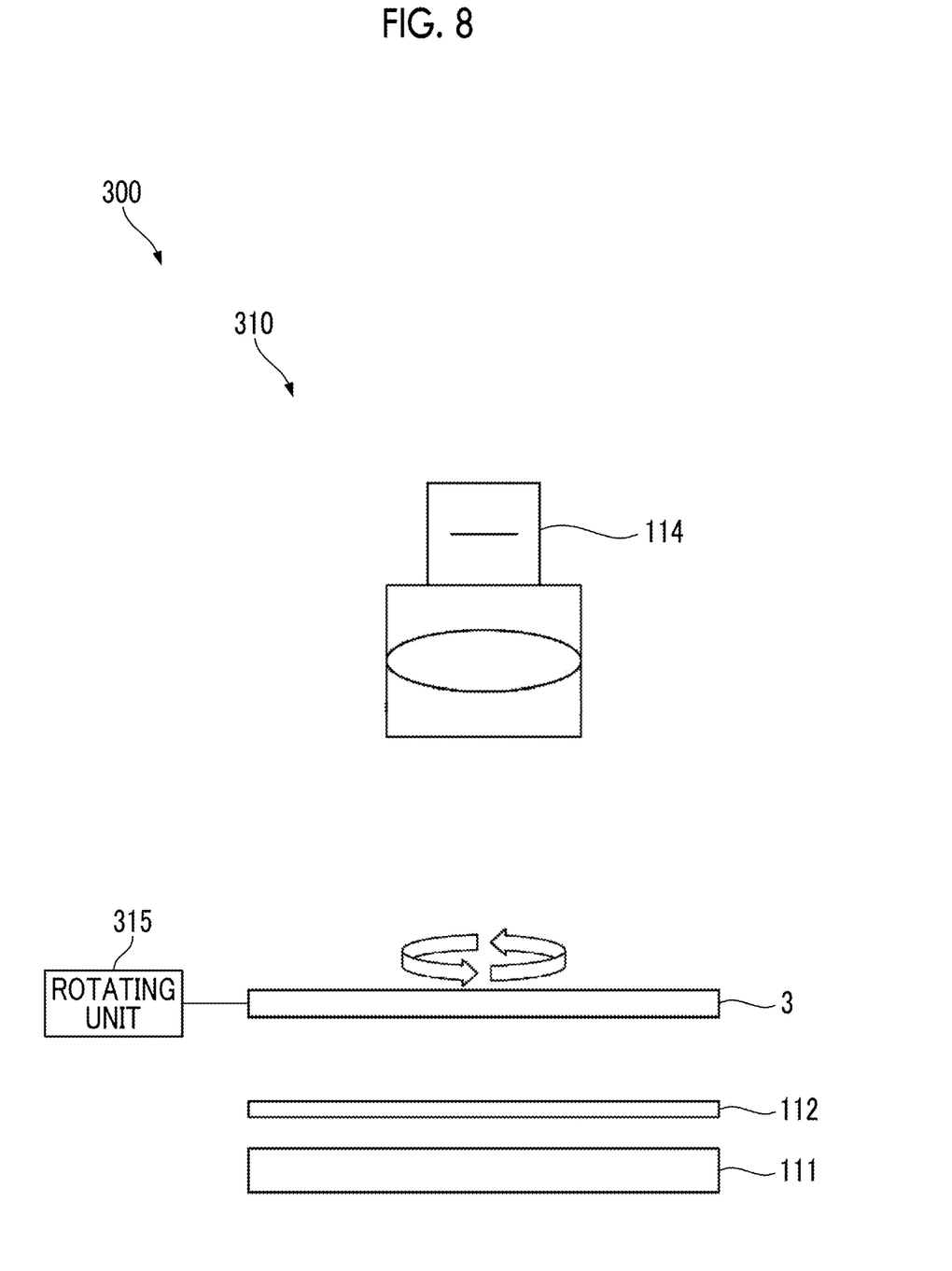
FIG. 8 is a diagram illustrating an example of a schematic configuration of an inspection apparatus according to further embodiment.

FIG. 8 is a diagram illustrating an example of a schematic configuration of an inspection apparatus 300 according to further embodiment. The inspection apparatus 300 according to further embodiment differs from the inspection apparatus 100 according to one embodiment in terms of the imaging device 110. The difference from one embodiment will be described below. Those components common to one and further embodiments are denoted by the same reference numerals without detailed description.

An imaging device 310 according to further embodiment has the light source 111, the linear polarizer 112, the polarization camera 114, and rotating unit 315 for rotating the molding product 3. The rotating unit 315 rotates the molding product 3 by 45, 90, and 135 degrees around a line orthogonal to the plate surface of the film-shaped linear polarizer 112 as a rotation center.

In the imaging device 310 configured as described above, the molding product 3 molded by the injection molding machine 2 is disposed above the linear polarizer 112, and the light transmitted through the molding product 3 is imaged by the polarization camera 114. Further, the rotating unit 315 rotates the molding product 3 by 45, 90, and 135 degrees, and the polarization camera 114 images the light transmitted through the molding product 3 at each rotation angle. The polarization camera 114 outputs, to the processing device 120, images corresponding to the above four polarization angles at the rotation angles of 0, 45, 90, and 135 degrees and an image obtained by calculating the direction and degree of polarization using the images. It should be noted that the rotating unit 315 for rotating the molding product 3 is not particularly limited in terms of configuration and rotation method. The molding product 3 may be rotated by a robot or manually.

The imaging device 310 configured in this manner is also capable of outputting a striped image corresponding to the stress distribution attributable to the flow field or the crystal direction of the resin as illustrated in FIG. 4. Then, by the determination unit 132 determining the state of the molding product 3 using this image, it can be determined with high accuracy whether or not the molding product 3 is normally molded.

Still Further Embodiment

Figure 9:
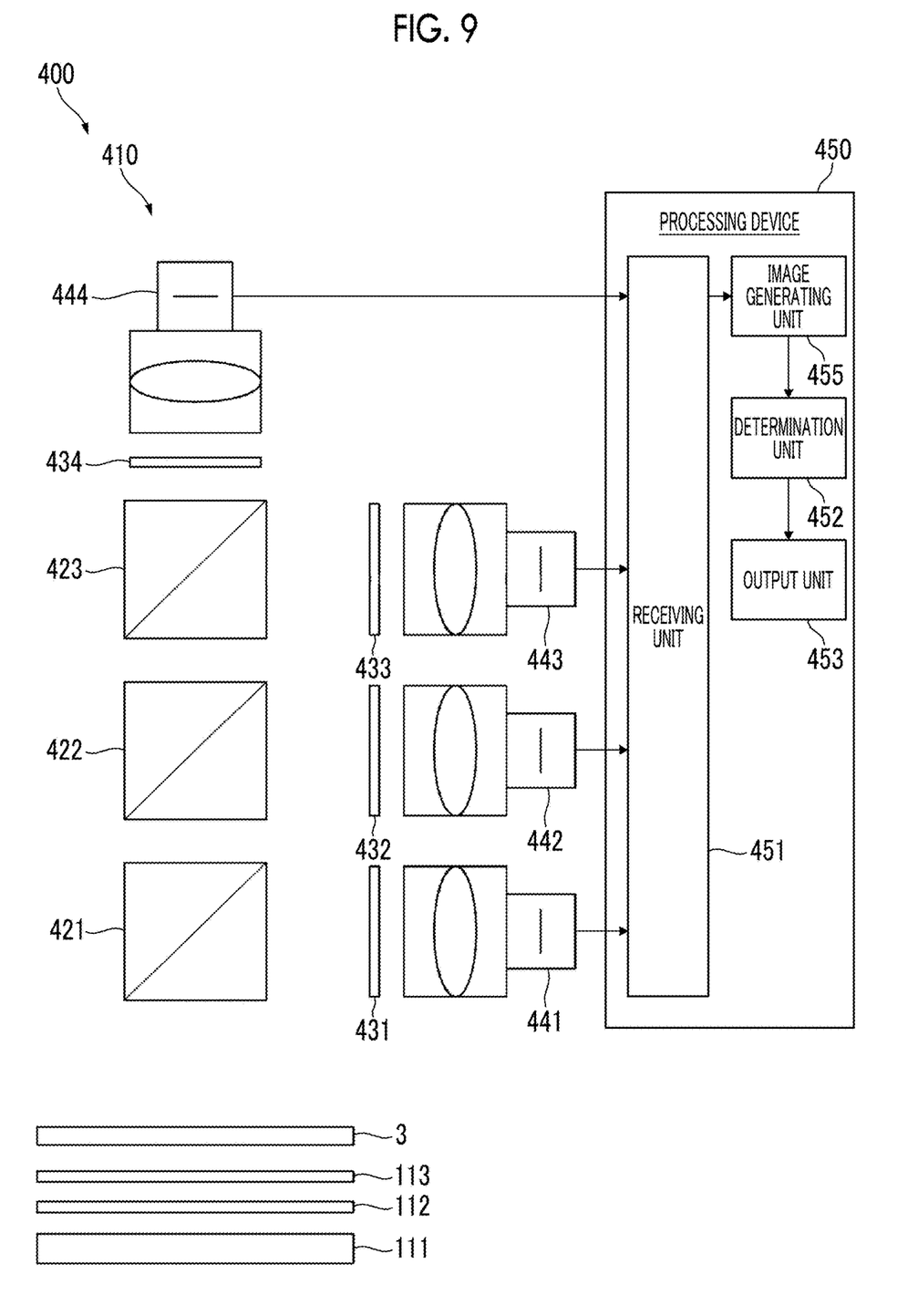
FIG. 9 is a diagram illustrating an example of a schematic configuration of an inspection apparatus according to still further embodiment.

FIG. 9 is a diagram illustrating an example of a schematic configuration of an inspection apparatus 400 according to still further embodiment.

The inspection apparatus 400 according to still further embodiment differs from the inspection apparatus 100 according to one embodiment in that the inspection apparatus 400 includes an imaging device 410 corresponding to the imaging device 110 and a processing device 450 corresponding to the processing device 120. The difference from one embodiment will be described below. Those components common to one and still further embodiments are denoted by the same reference numerals without detailed description.

The imaging device 410 according to still further embodiment has the light source 111, the linear polarizer 112, and the wave plate 113. In addition, the imaging device 410 has a first beam splitter 421 partially reflecting and partially transmitting the light emitted from the light source 111, a second beam splitter 422 partially reflecting and partially transmitting the light transmitted through the first beam splitter 421, and a third beam splitter 423 partially reflecting and partially transmitting the light transmitted through the second beam splitter 422. In addition, the imaging device 410 has a first linear polarizer 431 producing linearly polarized light from the light reflected by the first beam splitter 421 and a first camera 441 imaging the light transmitted through the first linear polarizer 431. In addition, the imaging device 410 has a second linear polarizer 432 producing linearly polarized light from the light reflected by the second beam splitter 422 and a second camera 442 imaging the light transmitted through the second linear polarizer 432. In addition, the imaging device 410 has a third linear polarizer 433 producing linearly polarized light from the light reflected by the third beam splitter 423 and a third camera 443 imaging the light transmitted through the third linear polarizer 433. In addition, the imaging device 410 has a fourth linear polarizer 434 producing linearly polarized light from the light transmitted through the third beam splitter 423 and a fourth camera 444 imaging the light transmitted through the fourth linear polarizer 434.

Although the first camera 441, the second camera 442, the third camera 443, and the fourth camera 444 have imaging elements and lenses, the first camera 441, the second camera 442, the third camera 443, and the fourth camera 444 are, unlike the polarization camera 114, general cameras that do not have polarizers of 0, 45, 90, and 135 degrees.

The polarization axis (transmission axis) of the second linear polarizer 432 is inclined by 45 degrees with respect to the polarization axis of the first linear polarizer 431. The polarization axis (transmission axis) of the third linear polarizer 433 is inclined by 90 degrees with respect to the polarization axis of the first linear polarizer 431. The polarization axis (transmission axis) of the fourth linear polarizer 434 is inclined by 135 degrees with respect to the polarization axis of the first linear polarizer 431.

In the imaging device 410 configured as described above, the molding product 3 molded by the injection molding machine 2 is disposed above the wave plate 113, and the light transmitted through the molding product 3 is imaged by the first camera 441, the second camera 442, the third camera 443, and the fourth camera 444. Then, each of the first camera 441, the second camera 442, the third camera 443, and the fourth camera 444 outputs a captured image to the processing device 450.

The processing device 450 differs from the processing device 120 in that the processing device 450 performs processing of generating an image obtained by calculating the direction and degree of polarization using the images captured by the first camera 441, the second camera 442, the third camera 443, and the fourth camera 444. More specifically, the processing device 450 has a receiving unit 451 receiving the images of the molding product 3 respectively output from the first camera 441, the second camera 442, the third camera 443, and the fourth camera 444 and an image generating unit 455 generating an image obtained by calculating the direction and degree of polarization using the images respectively captured by the first camera 441, the second camera 442, the third camera 443, and the fourth camera 444 and received by the receiving unit 451. In addition, the processing device 450 has a determination unit 452 determining the quality of the molding product 3 using the image generated by the image generating unit 455 and an output unit 453 outputting the determination result of the determination unit 452 to the control device 40. The functions of the determination unit 452 and the output unit 453 are the same as those of the determination unit 132 and the output unit 133, respectively.

According to the inspection apparatus 400 configured as described above, the image generating unit 455 is capable of generating a striped image corresponding to the stress distribution attributable to the flow field or the crystal direction of the resin as illustrated in FIG. 4 using the image output from the imaging device 410. Then, by the determination unit 452 determining the state of the molding product 3 using this image, it can be determined with high accuracy whether or not the molding product 3 is normally molded.

It should be understood that the invention is not limited to the above-described embodiment, but may be modified into various forms on the basis of the spirit of the invention. Additionally, the modifications are included in the scope of the invention.

What is claimed is:

1. An inspection apparatus comprising:
   an imaging device; and
   a processing device,
   wherein the imaging device comprises
      a light source,
      a polarized light generator configured to generate polarized light from light emitted from the light source, and
      a polarization camera configured to image the polarized light generated by the polarized light generator and transmitted through a molding product which is disposed between the polarized light generator and the polarization camera,
   the processing device comprises one or more processors and a memory storing instructions thereon, the instructions when executed by the one or more processors causing the one or more processors to
      receive images captured by the polarization camera,
      store, in the memory, a reference image obtained by simulation and representing the molding product determined to be normal, and
      determine a state of the molding product by calculating a degree of similarity between the received images and the reference image stored in the memory.

2. The inspection apparatus according to claim 1, wherein the polarized light generator includes:
   a linear polarizer generating linearly polarized light from the light emitted from the light source; and
   a wave plate changing a polarization direction of the linearly polarized light or converting the linearly polarized light into circularly polarized light.

3. The inspection apparatus according to claim 2, wherein the wave plate is a λ/4 wave plate converting the linearly polarized light into the circularly polarized light.

4. The inspection apparatus according to claim 1, wherein the polarized light generator includes:
   a linear polarizer generating linearly polarized light from the light emitted from the light source; and
   a rotating unit relatively rotating the linear polarizer and the molding product.

5. The inspection apparatus according to claim 1, wherein the polarization camera calculates a polarization direction and a degree of polarization using the images corresponding to four polarization angles.

6. The inspection apparatus according to claim 1, wherein the polarized light generator includes:
   a first beam splitter partially reflecting and partially transmitting the light emitted from the light source;
   a second beam splitter partially reflecting and partially transmitting the light transmitted through the first beam splitter; and
   a third beam splitter partially reflecting and partially transmitting the light transmitted through the second beam splitter.

7. The inspection apparatus according to claim 6, wherein the polarized light generator further includes:
   a first linear polarizer producing linearly polarized light from the light reflected by the first beam splitter;
   a second linear polarizer producing linearly polarized light from the light reflected by the second beam splitter;
   a third linear polarizer producing linearly polarized light from the light reflected by the third beam splitter; and
   a fourth linear polarizer producing linearly polarized light from the light transmitted through the third beam splitter.

8. The inspection apparatus according to claim 7, wherein
   a polarization axis of the second linear polarizer is inclined by 45 degrees with respect to a polarization axis of the first linear polarizer,
   a polarization axis of the third linear polarizer is inclined by 90 degrees with respect to the polarization axis of the first linear polarizer, and
   a polarization axis of the fourth linear polarizer is inclined by 135 degrees with respect to the polarization axis of the first linear polarizer.

9. An injection molding system comprising:
   an injection molding machine; and
   an inspection apparatus for inspecting a molding product molded by the injection molding machine, the inspection apparatus comprising:
      an imaging device; and
      a processing device,
   wherein the imaging device comprises
      a light source,
      a polarized light generator configured to generate polarized light from light emitted from the light source, and
      a polarization camera configured to image the polarized light generated by the polarized light generator and transmitted through a molding product which is disposed between the polarized light generator and the polarization camera,
   the processing device comprises one or more processors and a memory storing instructions thereon, the instructions when executed by the one or more processors causing the one or more processors to
      receive images captured by the polarization camera,
      store, in the memory, a reference image obtained by simulation and representing the molding product determined to be normal, and
      determine a state of the molding product by calculating a degree of similarity between the received images and the reference image stored in the memory.

10. An inspection method comprising:
    generating polarized light from light emitted from a light source;
    imaging the generated polarized light transmitted through a molding product with a polarization camera, in which the molding product is disposed between a polarized light generator and the polarization camera;
    receiving images captured by the polarization camera;
    storing, in a memory, a reference image obtained by simulation and representing the molding product determined to be normal; and determining a state of the molding product by calculating a degree of similarity between the received images and the reference image stored in the memory.

\* \* \* \* \*